(12) United States Patent
Komai et al.

(10) Patent No.: US 6,424,821 B1
(45) Date of Patent: Jul. 23, 2002

(54) WORKING MACHINE AND ITS COMMUNICATION METHOD

(75) Inventors: Yasuhiro Komai, Takahama; Yukio Masuda, Ichikawa, both of (JP)

(73) Assignee: NT Engineering Kabushiki Kaisha (JP)

(*) Notice: Subject to any disclaimer, the term of this patent is extended or adjusted under 35 U.S.C. 154(b) by 0 days.

(21) Appl. No.: 09/367,518

(22) PCT Filed: Feb. 5, 1998

(86) PCT No.: PCT/JP98/00472

§ 371 (c)(1),
(2), (4) Date: Aug. 13, 1999

(87) PCT Pub. No.: WO98/35781

PCT Pub. Date: Aug. 20, 1998

(30) Foreign Application Priority Data

Feb. 14, 1997 (JP) .............................. 9-067170

(51) Int. Cl.⁷ ................................ H04Q 7/32
(52) U.S. Cl. ................. 455/66; 455/67.1; 455/344; 409/193; 409/186; 340/693.5
(58) Field of Search ................ 455/66, 67.1, 423, 455/424, 425, 78, 550, 344, 347, 575, 90; 409/193, 186; 340/693.5, 693.9

(56) References Cited

U.S. PATENT DOCUMENTS

| 4,090,802 A | 5/1978 | Bilz ............................ 408/6 |
| 4,118,871 A | 10/1978 | Kirkham ..................... 33/174 |
| 4,831,785 A | 5/1989 | Sigg ............................ 51/165 |
| 5,564,872 A | 10/1996 | Veil et al. ................... 409/234 |

FOREIGN PATENT DOCUMENTS

| DE | 90 14 037.0 | 2/1991 |
| DE | 42 29 569 C1 | 2/1994 |
| GB | 2 141 365 A | 12/1984 |
| JP | 59073265 A | 4/1984 |
| JP | 64-52641 | 3/1989 |
| JP | 2-41851 | 2/1990 |
| JP | 3-11549 | 1/1991 |
| JP | 3-296329 | 12/1991 |
| JP | 5-18138 | 1/1993 |
| JP | 05337857 A | 12/1993 |
| JP | 7-154288 | 6/1995 |

OTHER PUBLICATIONS

Patent Abstract of Japan/Control System in Phase Angle Changing Jig Publication No. 59073265 and Publication Date: Apr. 25, 1984.
Patent Abstracts of Japan/Tool Holder Type Detector Publication No.: 05337857 and Publication Date: Dec. 21, 1993.
European Search Report for 98901514.4–1262–JP9800472.

*Primary Examiner*—William Trost
*Assistant Examiner*—Keith Ferguson
(74) *Attorney, Agent, or Firm*—Young & Basile, P.C.

(57) ABSTRACT

A working machine includes a cutting machine, a tool holder which can be installed to or removed from the spindle of the cutting machine, a transmission and reception mechanism installed in the tool holder, and a controller for performing radio communication with the transmission and reception mechanism via electromagnetic waves. An antenna configuring the transmission and reception mechanism is installed in a radio wave transparent material and a cover material at a distance from the circumference of the tool holder for radio communication between the tool holder and the external controller.

13 Claims, 13 Drawing Sheets

WORKING MACHINE AND ITS COMMUNICATION METHOD

FIELD OF THE INVENTION

This invention relates to the working machine which externally controls a tool holder where a tool is mounted, and its communication method.

BACKGROUND OF THE INVENTION

The automatic tool changer mechanism (ATC) in a machining center or the like changes various tools automatically. In this kind of work, a tool holder having a so called ATC shank is used, and the tool holder is generally installed to or removed from the spindle.

There is a request to control detection and position adjustment of the machining state of the tool in the tool holder using an external controller. A method to send infrared control signals to the tool holder is generally considered.

However, if the infrared control signal is used, position alignment and phase matching between the projector element and receiver element are necessary, and this kind of work is considerably cumbersome. Furthermore, this method uses optical lenses where coolant and chips are likely to attach, possibly causing malfunction and communication failure.

This invention aims to remove such trouble, aiming at providing a working machine which can send and receive signals between the tool holder and an external controller using radio communication, and a communication method.

SUMMARY OF THE INVENTION

Radio communication by means of electromagnetic waves is performed between the controller and a transmission and reception mechanism installed in the tool holder to which a tool is mounted. Here, the transmission and reception mechanism comprises an antenna which is wound at a distance around an electrically conductive part of the tool holder via a radio wave transparent material. For this reason, transmission and reception by means of radio communication are securely performed between the transmission and reception mechanism and the controller without effects on the tool holder which is made of iron, aluminum and other materials which absorb the radio wave.

During the radio communication procedure, when a predetermined working signal is supplied by the controller to the tool holder via an electromagnetic wave, a confirmation electromagnetic wave is sent back from the tool holder to the controller. This provides a secure detection means for the supply of the predetermined working signal to the tool holder, making it possible to avoid erroneous transmission and reception actions and to perform accurate radio communication control.

Further, when the transmission side sends a basic electromagnetic wave and an identifying signal wave simultaneously, the reception side performs a predetermined action corresponding to the signal wave only if both the basic electromagnetic wave and the signal wave are received. Therefore erroneous actions can be avoided and various actions can be performed at a high precision.

A radio wave transparent cover material is installed around the antenna. For this reason the antenna can be effectively protected against coolant and other foreign matter.

Further, the tool holder houses a starting switch circuit which makes it possible to supply electric energy from the power supply to the predetermined acting part inside the tool holder upon radio communication from the controller. This makes it possible to turn the power on during use of the tool holder only when necessary, making it possible to effectively cut waste electric energy through efficient use of the power supply. Here, the tool holder comprises a state display means driven by the starting switch circuit for direct monitor of the action state of the tool holder, thereby improving reliability.

The tool holder also comprises a correction head or measuring head, and the state of tool position adjustment by means of the correction head or the machining state of the workpiece by means of the measuring head can be automatically detected via the controller using radio communication.

DESCRIPTION OF THE PREFERRED EMBODIMENTS

Figure 1:
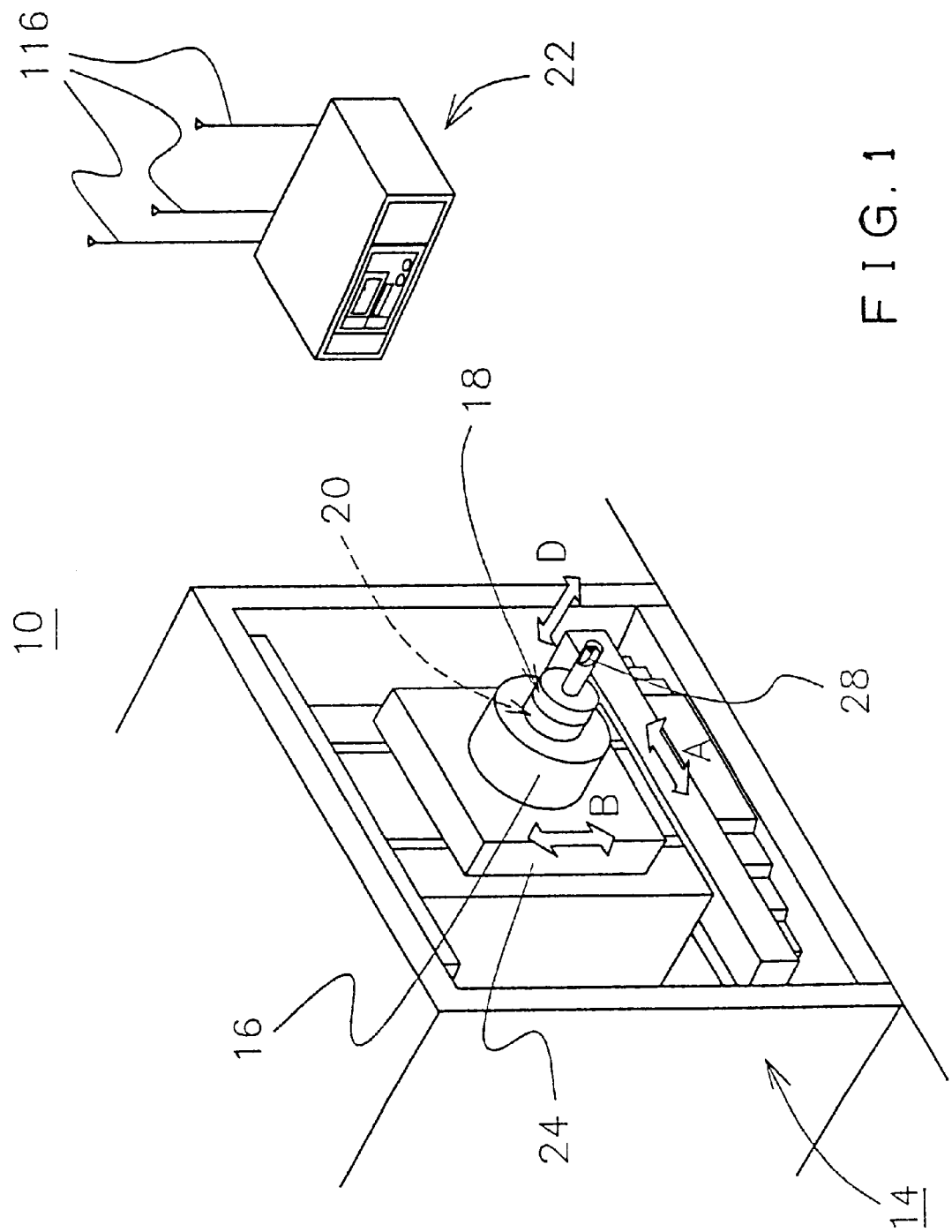
FIG. 1 is an overall perspective view of the working machine engaged with a first implementation style of this invention.

FIG. 1 shows an overall perspective view of a working machine 10 engaged with a first implementation style of this invention.

The working machine 10 includes a cutting machine 14, a tool holder 18 which can be mounted to or removed from the spindle 16 of the cutting machine 14, a transmission and reception mechanism 20 installed on the tool holder 18, and a controller 22 which communicates with a transmission and reception mechanism 20 via electromagnetic waves.

The spindle 16 is linked with a rotation drive source, not shown in the drawing, and is held on a movable base 24 with the capability of rotation, and can move in the directions of arrow A (horizontal direction), arrow B (vertical direction) and arrow D (axial direction).

Figure 2:
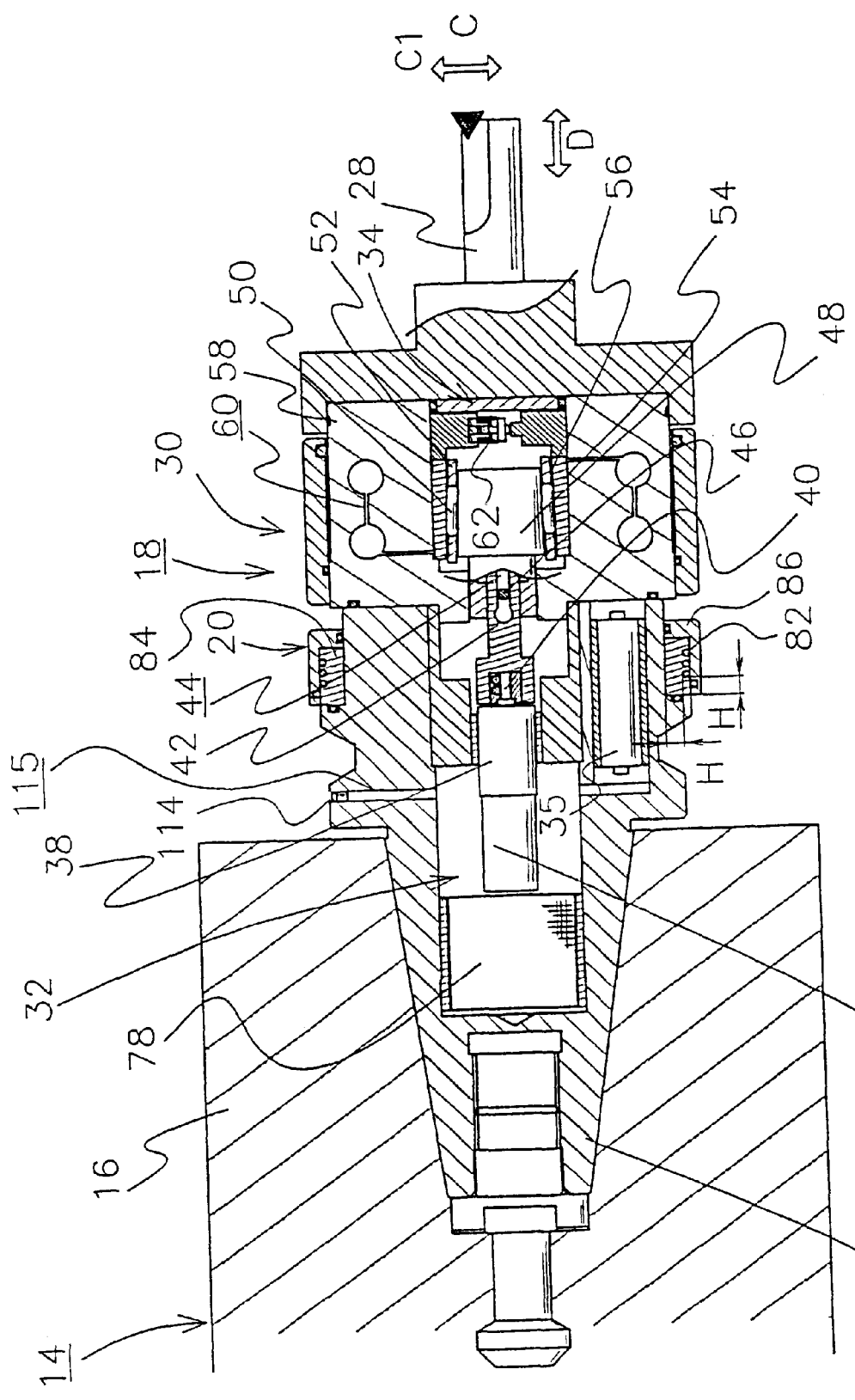
FIG. 2 is a longitudinal cross-sectional view of the tool holder configuring the working machine engaged with the first implementation style.

As shown in FIG. 2, a tool holder 18 has a shank 26 on one end which can be fitted to the spindle 16, and accepts a tool 28 at another end. The tool holder 18 houses a correction head 30 which can adjust the position of the tool 28 in the diametrical direction (direction of arrow C) of the spindle 16, a driving mechanism 32 which drives the correction head 30, a detection mechanism 34 for detecting the adjusting state of the correction head 30, and a battery (DC power supply) 35.

The driving mechanism 32 houses a reversible DC motor 36 built in the tool holder 18, and a reduction gear 38 linked with the driving shaft of the DC motor 36. The reduction gear 38 is adjusted to a large gear ratio. A drive adapter 42 is linked with an output shaft 40 of the reduction gear 38, and a conical taper drive shaft 48 is engaged via a pin 46 with a slit 44 formed in the axial direction (direction of arrow D) on the end of the drive adapter 42 so that it can advance or retract in the axial direction. Multiple rollers 50 are arranged at a slight inclination via a cage 52 on the circumference of the taper drive shaft 48, and a power unit 54 is installed on the outside of the rollers 50.

The internal surface of the power unit 54 is a taper surface 56 matching the circumference of the taper drive shaft 48, and the external surface of the power unit 54 has the same dimensions (straight circumference) in the axial direction. A pair of slits (not shown in the drawing) are cut in the power unit 54 closely from both ends and, when the taper drive shaft 48 rotates, the taper drive shaft 48 and the rollers 50 rotate and shift back and forth, thereby contracting and enlarging in a predetermined range.

A head housing 58 is arranged around the power unit 54. The head housing 58 is of a single cylindrical shape, around which an S-shaped slit 60 is formed. When the power unit 54 increases its diameter, the head housing 58 is pressed in the diametrical direction to be displaced in the direction of arrow C1 via the S-shaped slit 60.

The detection mechanism 34 comprises a displacement sensor (linear sensor) 62 which detects compensatory displacement of the head housing 58 in the direction of arrow C. The sensor 62 houses a coil 66 arranged in a magnetic shield 64, shown in FIG. 3, and a measuring core 70 can advance or retract along a guide 68 around which a coil 66 is installed. The measuring core 70 is arranged on a contact 72, and a guide 68 is fixed to one of contracting/enlarging half pieces of the power unit 54 via a fixing material 73. A sensor presser 75 is fixed with screws to another contracting/enlarging half piece of the power unit 54 across the contact 72, and the contact 72 and the sensor presser 75 move in the direction of arrow C in a unified body with the head housing 58 while maintaining a pressing state.

An end of a metallic bellows capsule 74 is fixed to the contact 72, and the bellows capsule 74 covers the coil 66 and a magnetic shield 64. The bellows capsule 74 functions as a waterproof cover of the entire detector mechanism 34 and, as far as this purpose is fulfilled, it can be substituted with another material such as, for example, a cylinder with an O ring or a rubber cover.

The coil 66 of the sensor 62 is connected to an oscillation modulator 76 when it is installed on a circuit board 78 (see FIG. 2) which houses the oscillation modulator 76 in the tool holder 18. When high frequencies in the Megahertz (MHz) band are sent from the oscillation modulator 76 to a transmitter 80, an antenna wire 82 is connected to the transmitter 80. As shown in FIG. 2, the antenna wire 82 is installed in a radio wave transparent material 84 and a cover material 86 around the tool holder 18, thereby configuring a transmission and reception mechanism 20.

Generally speaking, the tool holder 18 consists of iron, aluminum and other (electrically conductive) materials which absorb radio waves, around which a radio wave transparent material 84 consisting of synthetic resin, synthetic fiber, compound rubber, glass, paper, wood, porcelain or other materials which allow radio waves to pass is installed. The antenna wire 82 is wound at a distance H (1 to 20 mm, or preferably 3 to 8 mm) from the end of the tool holder 18 via the radio wave transparent material 84.

Figure 4A:
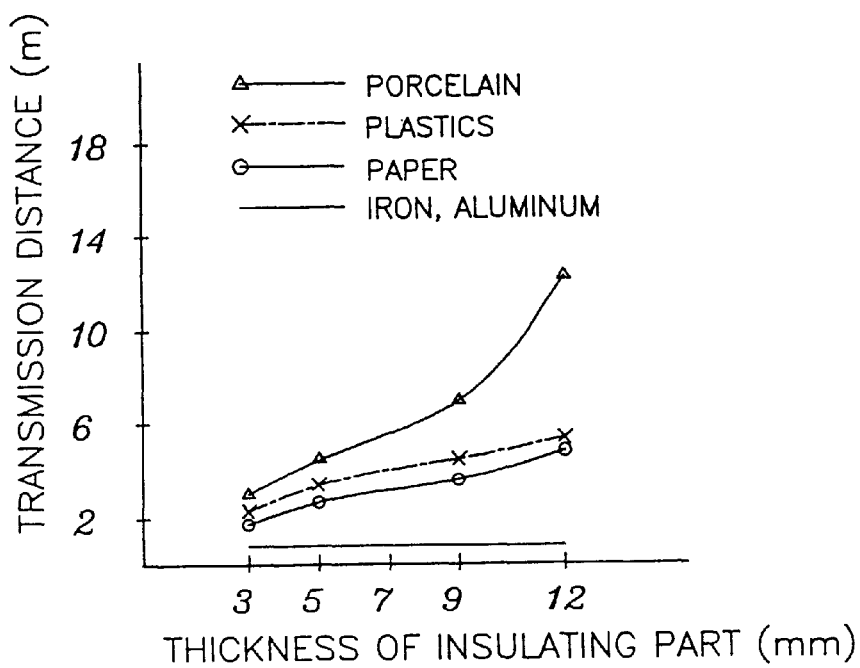
FIGS. 4A and 4B are graphs depicting relationships between the thickness of insulating parts consisting of various materials and the transmission distance and reception sensitivity.
Figure 4B:
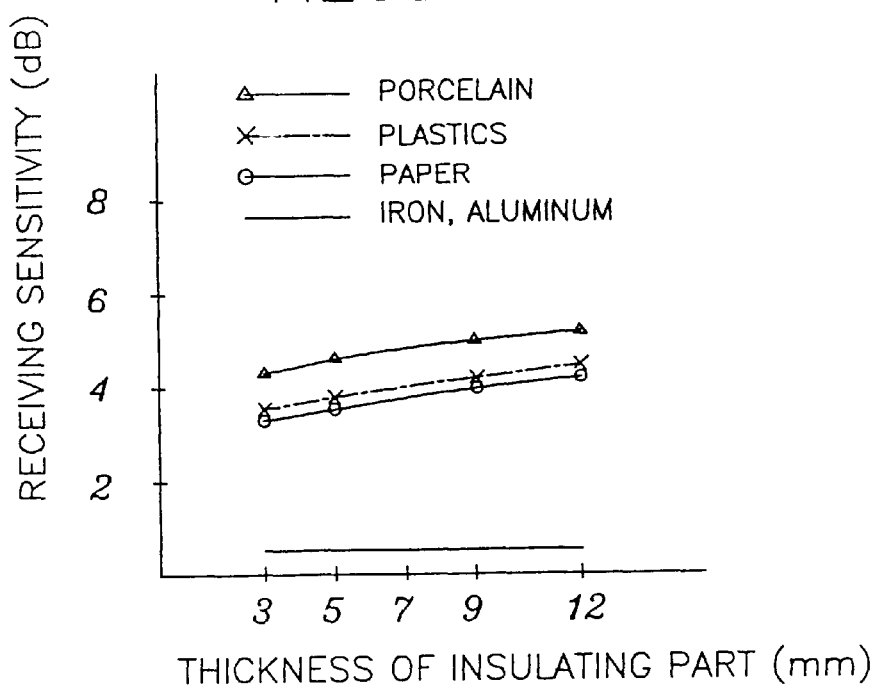

FIG. 4A shows the transmission distance of the radio wave from the antenna wire 82 for a transmitter with various thickness of the radio wave transparent material 84 made of paper, synthetic resin and porcelain installed on the iron tool holder 18. When the antenna wire 82 is directly wound around the tool holder 18, almost no transmission distance is obtained. On the other hand, FIG. 4B shows reception sensitivity of the antenna wire 82 for a receiver installed on the tool holder 18 via a radio wave transparent material 84 under the same condition as the above.

The cover material 86 is made of a radio wave transparent material similar to the radio wave transparent material 84 fixed around the antenna wire 82. The cover material 86 must be superior in rigidity and water resistance, and should be made of synthetic resin.

Figure 5:
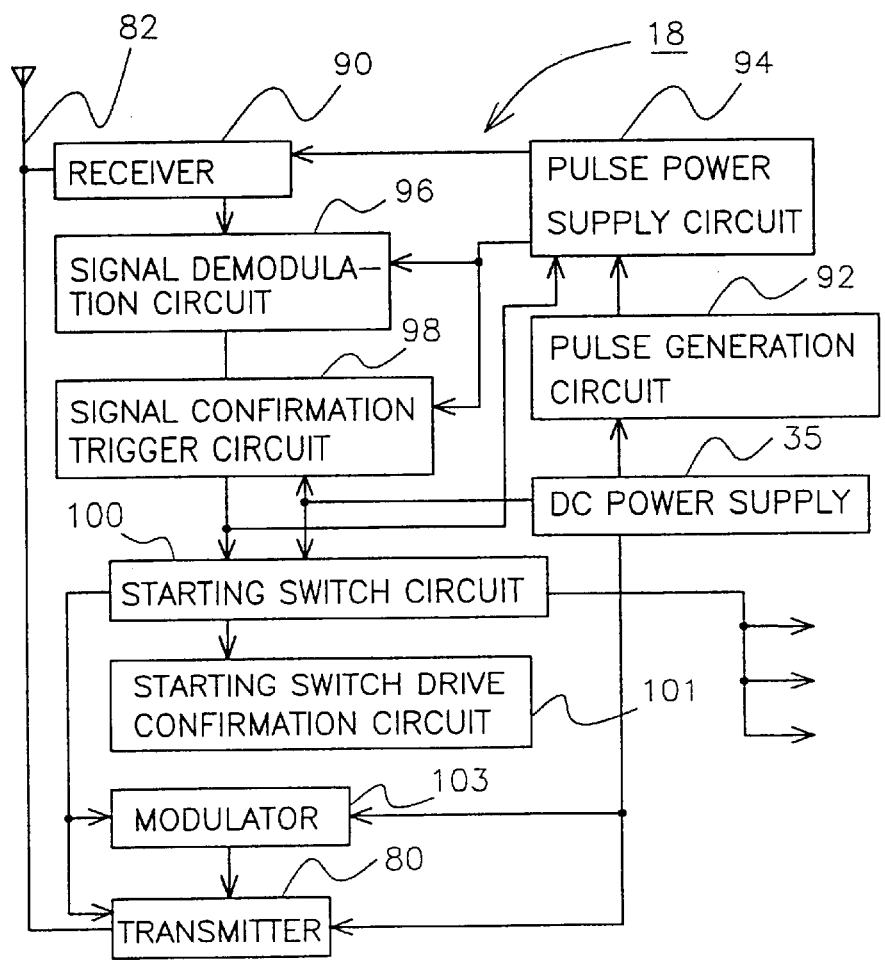
FIG. 5 is a block diagram of the starting switch circuit in the said tool holder.

As shown in FIG. 5, the antenna wire 82 is connected with the receiver 90 which is driven via a pulse power supply circuit 94 connected to a pulse generation circuit 92 driven by a battery 35. The signal received at the receiver 90 is sent via a signal demodulation circuit 96 to a signal confirmation trigger circuit 98, and it is further sent to a starting switch circuit 100. The starting switch circuit 100 is connected with a starting switch drive confirmation circuit 101 and a modulator 103, which is connected with the transmitter 80.

Figure 3:
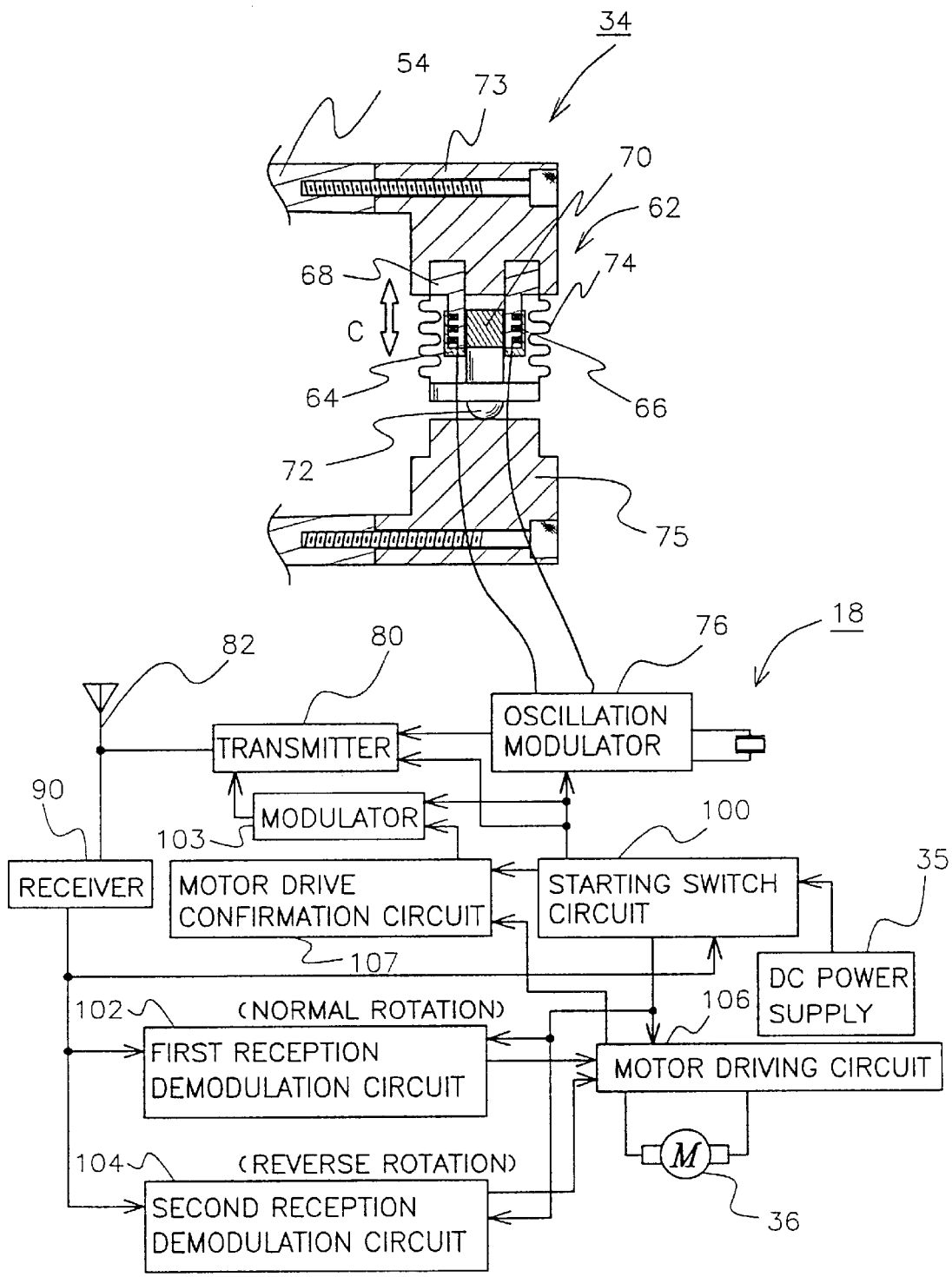
FIG. 3 is an enlarged cross-sectional view and block diagram of the detecting mechanism in the tool holder shown in FIG. 2.

As shown in FIG. 3, the starting switch circuit 100 is connected with first and second reception demodulation circuits 102 and 104 for supplying normal/reverse rotation signals to the DC motor 36, and a motor driving circuit 106 comprising a normal/reverse rotation selection circuit for controlling the DC motor 36. The motor driving circuit 106 is connected via a motor drive confirmation circuit 107 with a modulator 103.

Figure 6:
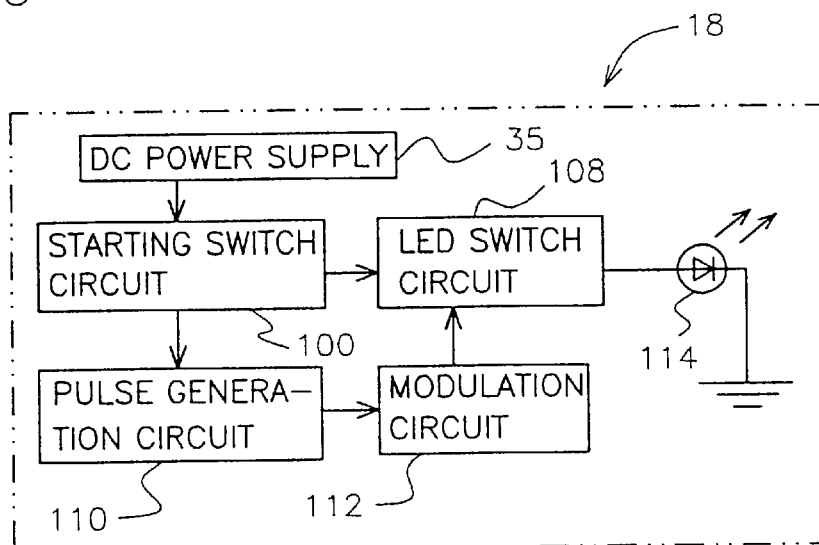
FIG. 6 is a block diagram of the LED drive circuit in the tool holder.

As shown in FIG. 6, the starting switch circuit 100 is further connected with an LED switch circuit 108 and a pulse generation circuit 110. The pulse generation circuit 110 is connected with a modulation circuit 112 which sends a driving signal to the LED switch circuit 108 connected with an LED (state display means) 114. As shown in FIG. 2, the LED 114 is fixed to an aperture 115 drilled from the circumference of the tool holder 18 toward the center, and its edge is arranged on the same plane as the circumference of the tool holder 18.

Figure 7:
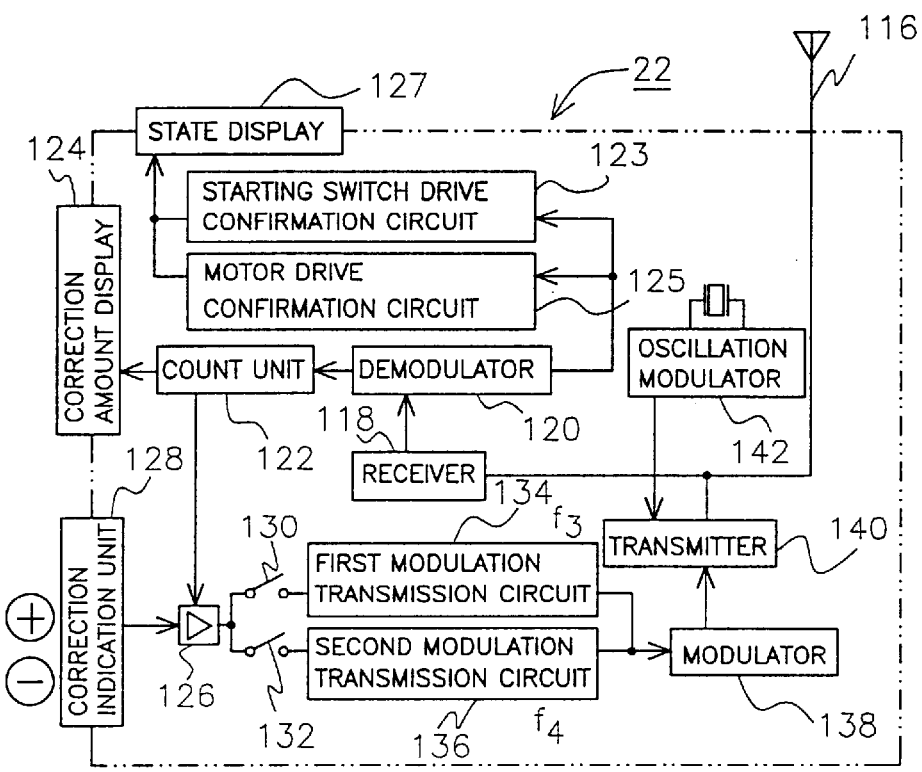
FIG. 7 is a block diagram of the controller configuring the working machine engaged with the first implementation style of the invention.

As shown in FIG. 7, the controller 22 comprises a receiver 118 which receives electromagnetic waves from the antenna wire 82 of the transmitter 80 at an antenna 116. The receiver 118 supplies the electromagnetic wave to a demodulator 120. The demodulator 120 is connected with a count unit 122, a starting switch drive confirmation circuit 123 and a motor drive confirmation circuit 125.

While the starting switch drive confirmation circuit 123 and the motor drive confirmation circuit 125 are connected with a state display 127, the count unit 122 converts the input signal into pulses and finely disassembles the frequency, to be converted as a correction amount and displayed at a correction amount display 124, and a calculation unit 126 calculates the correction displacement of the correction head 30.

The controller 22 houses a correction indication unit 128, and the positive (normal rotation) and negative (reverse rotation) signals from the correction indication unit 128 are input to the calculation unit 126. The calculation unit 126 is connected via first and second switches 130 and 132 with first and second modulation transmission circuits 134 and 136. The first and second modulation transmission circuits 134 and 136 supply the normal or reverse rotation drive signal via a modulator 138 to the transmitter 140 which is connected with an oscillation modulator 142. When the transmitter 140 is turned on, the receiver 90 on the side of the tool holder 18 operates, driving the DC motor 36 to rotate according to the normal or reverse rotation correction instruction.

Actions of the working machine 10 configured as described above and engaged with the first implementation style of the invention are described as follows.

The tool holder 18 installed in the spindle 16 moves in the direction of arrow A, B or D while rotating under the action of the cutting machine 14, and performs a predetermined machining process (for example, drilling) on a workpiece, not shown in the drawing. Then the diameter of the drilled hole is measured and, if the machining bore is not in the tolerance, correction is made to the tool 28.

Figure 8:
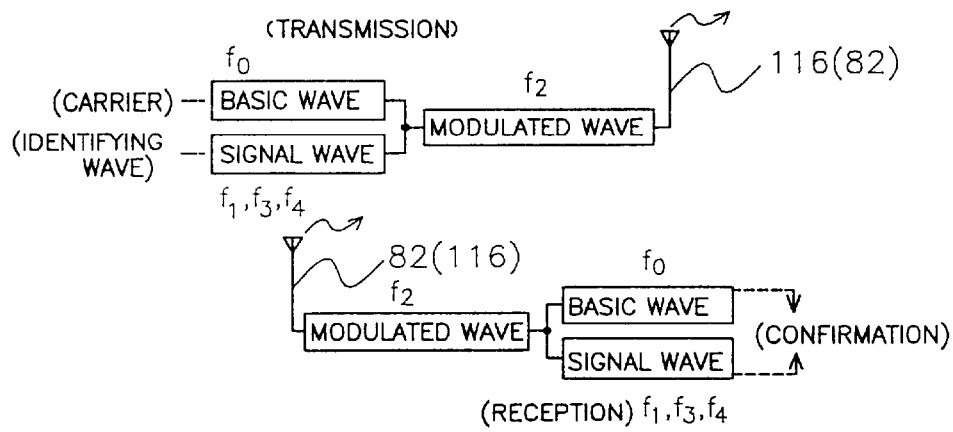
FIG. 8 is a block diagram of radio communication by means of the controller and the tool holder.

That is, in an interval between completion of a series of machining processes and the machining processes for the next workpiece (not shown in the drawing), the spindle 16 is transferred to the predetermined waiting position and the tool holder 18 enters a preparatory state. Next, in the controller 22, a modulated wave f2, where an identifying signal wave f1 is added to a carrier basic wave f0, is transmitted from the oscillation modulator 142 via the transmitter 140 at the antenna 116, as shown in FIG. 8. The modulated wave f2 is, as shown in FIG. 5, sent from the antenna wire 82 of the tool holder 18 to the receiver 90.

If the signal wave f1 is a starting switch activation signal which turns on the starting switch circuit 100, the modulated wave f2 is recognized to be the basic wave f0 and the starting switch activation signal (signal wave f1) at the signal demodulation circuit 96. Only when the basic wave f0 and the signal wave f1 are recognized, the basic wave f0 and the signal wave f1 are sent to the signal confirmation trigger circuit 98 which sends the basic wave f0 and the signal wave f1 to the driving switch circuit 100 while deactivating the pulse power supply circuit 94 to drive the receiver 90 continuously.

The starting switch circuit 100 connects the battery 35 with the predetermined circuit to perform desired actions corresponding to the received signal wave f1. That is, the signal wave f1 activates the starting switch drive confirmation circuit 101 and, as shown in FIG. 3, drives the oscillation modulator 76, and is transmitted via the transmitter 80 at the antenna wire 82 to the controller 22 as a starting switch activation confirmation signal. As shown in FIG. 7, the signal wave f1 is sent via the demodulator 120 to the starting switch drive confirmation circuit 123. An answer-back sequence is thus configured (see FIG. 8).

Figure 9:
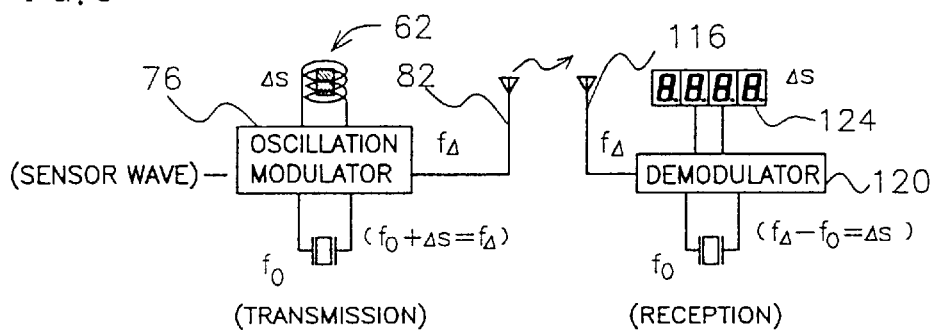
FIG. 9 is a block diagram of radio communication during sensor activation by means of the controller and the tool holder.

On the other hand, the guide 68 configuring the sensor 62 is fixed to one of contracting/enlarging half pieces of the power unit 54 while the sensor presser 75 is fixed to another one of contracting/enlarging half pieces of the power unit 54, so that the contact 72 and the sensor presser 75 maintain a pressing state at any time. For this reason, when the head housing 58 moves in the direction of arrow C, the measuring core 70 slides via the contact 72 and the sensor presser 75 along the guide 64. Also, as shown in FIG. 9, the total conductance of the coil 66 changes, producing a sensor variable high frequency (MHz) signal wave $f\Delta(=f0+\Delta s)$ at the oscillation modulator 76, where f0 is the high frequency signal frequency issued during deactivation of the sensor 62.

This high frequency wave is sent from the transmitter 80 via the antenna wire 82 and received via the antenna 116 at the receiver 118 in a radio wave, demodulated, and counted to measure the displacement of the sensor 62, that is, displacement of the correction head 30.

At this time, the controller 22 sends back the modulated wave f2 corresponding to the basic wave f0 and the signal wave f1 sent from the controller 22 to the tool holder 18, from the tool holder 18 as a confirmation signal (see FIG. 8). Therefore transmission of a predetermined signal from the controller 22 to the tool holder 18 is detected securely, making radio communication control very precise.

When the state of the correction head 30 is detected during radio communication with the sensor 62, the controller 22 performs radio communication to the tool holder 18 to rotate the DC motor 36 in a normal direction or in reverse via the calculation unit 126. For example, when a positive correction (normal rotation) instruction is given by the calculation unit 126 of the controller 22, the first switch 130 is turned on to send a normal rotation signal (normal rotation modulation signal f3) from the first modulation transmission circuit 134 and the transmitter 140 via the antenna wire 116 from the antenna wire 82 of the tool holder 18 to the receiver 90. The normal rotation signal is sent from the first reception demodulation circuit 102 to the motor driving circuit 106, and the DC motor 36 is rotated in a normal direction via the motor driving circuit 106.

On the other hand, when a negative correction (reverse rotation) instruction is given at the calculation unit 126 of the controller 22, the second switch 132 is turned on to send a reverse rotation signal (reverse rotation modulation signal f4) from the second modulation transmission circuit 136 and the transmitter 140 via the antenna 116 from the antenna 82 of the tool holder 18 to the receiver 90. The reverse rotation signal is sent from the second reception demodulation circuit 104 to the motor driving circuit 106, and the DC motor 36 is rotated in reverse via the motor driving circuit 106.

The rotation of the DC motor 36 is decelerated by the reduction gear 38 considerably. By this, a relatively small DC motor 36 can generate a large output (torque) When the drive adapter 42 linked to the output shaft 40 of the deceleration gear 38 rotates, the taper drive shaft 48 engaged to the drive adapter 42 via the slit 44 and the pin 46 rotates, and multiple rollers 50 rotate through contact with the circumference of the taper drive shaft 48.

Therefore, the taper drive shaft 48 and the multiple rollers 50 rotate in the back and forth direction (direction of arrow D), contracting or enlarging (in the direction of arrow C) the power unit 54 in the predetermined range. When the power unit 54 contracts or enlarges in the direction of arrow C, the sensor 62 is activated to transmit the displacement of the power unit 54, that is, displacement of the correction head 30, to the controller 22 on a radio wave.

In this case, according to the first implementation style, the radio wave transparent material 84 is installed on the circumference of the tool holder 18 configured by a radio wave absorbing body (electrically conductive matter), and the antenna wire 82 is wound at a certain distance H (1 to 20 mm, or preferably 3 to 8 mm) from the end of the tool holder 18 via the radio wave transparent material 84.

For this reason the transmission and reception mechanism 20 can transmit or receive control signals through radio communication with the controller 22 without effects of the tool holder 18 acting as a radio wave absorbing body. Especially when the antenna wire 82 is 3 to 8 mm from the end of the tool holder 18, radio communication is verified at a distance of 3 to 5 meters (see FIG. 4). Generally speaking, transmission and reception of electromagnetic wave and antenna are mutually contradictory, and transmission characteristics are the same as the reception characteristics.

Moreover, the cover material 86 which is made of a radio wave transparent material similarly to the radio wave transparent material 84, that is, water proof, is fixed on the circumference of the antenna wire 82. Therefore the transmission and reception mechanism 20 becomes waterproof as desired.

Further, the tool holder 18 comprises the starting switch circuit 100 for supplying electric energy from the battery 35 to the driving mechanism 32, the detection mechanism 34 and other parts upon radio communication from the controller 22. For this reason, the battery 35 can be used only when the tool holder 18 is installed and used in the spindle 16 and it is necessary for efficient use of the said battery 35.

The tool holder 18 includes the LED 114, acting as a state display means driven by the starting switch circuit 100. When the signal wave f1 is sent to the starting switch circuit 100, the starting switch circuit 100 sends signals to the LED switch circuit 108 and the pulse generation circuit 110. Therefore, the LED switch circuit 108 receives the signal supplied by the pulse generation circuit 110 to the modulation circuit 112 as well as the signal from the starting switch circuit 100. Using this, the LED switch circuit 108 drives the LED 114.

When the LED 114 is driven, the action state of the tool holder 18 can be displayed on the tool holder 18, for increased reliability through direct monitoring of the state of action of the tool holder. The blinking interval of the LED 114 and the lamp color can be varied to display and identify various operation states of the tool holder 18.

Further, through mutual radio communication between the tool holder 18 and the controller 22 using electromagnetic waves, the controller 22 drives and controls the DC motor 36 configuring the driving mechanism 32 in an answer back method, based on the data from the sensor 62 configuring the detection mechanism 34 on the side of the tool holder 18. Therefore the correction work of the correction head 30 can be made precise and secure.

Only when reception of both the basic wave f0 and the signal wave f1 (or f3, f4) is recognized, the predetermined action corresponding to the signal wave f1 (or f3, f4) is performed at the tool holder 18. For this reason, erroneous actions of the tool holder 18 are prevented and the tool holder can be used for precise operation of various actions.

Figure 10:
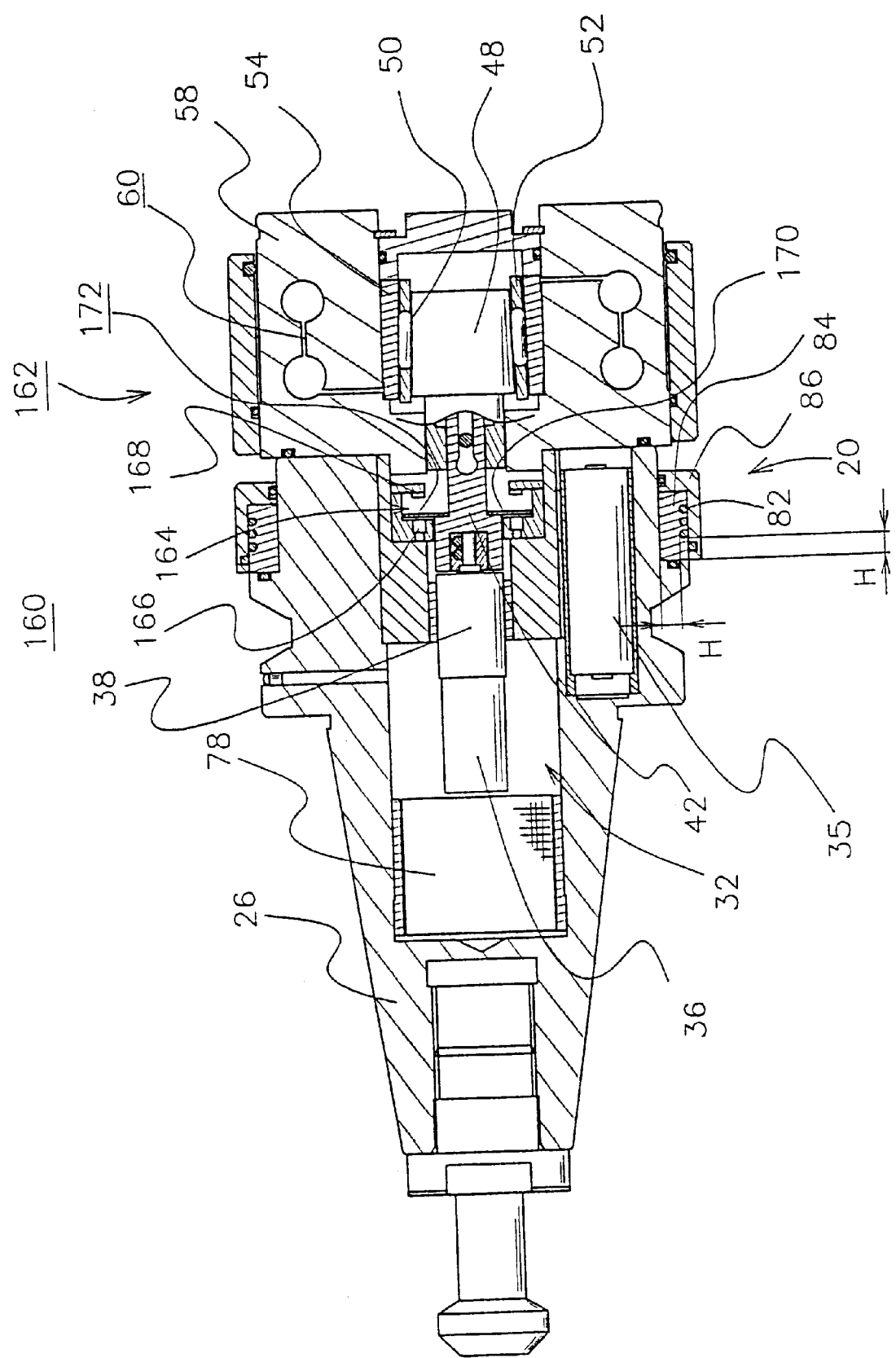
FIG. 10 is a longitudinal cross-sectional view of the tool holder configuring the working machine engaged with a second implementation style of this invention.

FIG. 10 shows a longitudinal cross section of the tool holder 162 configuring the working machine 160 engaged with the second implementation style of this invention. The same components as those of the tool holder 18 engaged with the first implementation style are attached with the same reference numbers and a detailed description of such components is omitted.

Figure 11:
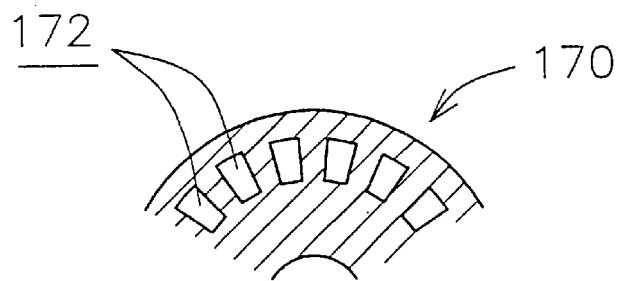
FIG. 11 is a partial front view of the detection mechanism in the tool holder engaged with the second implementation style of the invention.

The detection mechanism 164 built in the tool holder 162 configures an optical rotary encoder (rotation angle detection sensor) comprising a light source (light emitting diode, etc.) 166 and the light receiver (phototransistor, etc. ) 168 facing each other. A slot plate 170 is arranged between the light source 166 and the light receiver 168 via a drive adapter 42. In the slot plate 170, as shown in FIG. 11, multiple slits 172 are cut at an equal angle spacing at the light axis of the light source 166.

At the working machine 160 configured as described above, when the DC motor 36 is driven to adjust the correction head 30, the drive adapter 42 and the slot plate 170 rotate in a unified body via the DC motor 36, similarly to the tool holder 18 engaged with the first implementation style. For this reason, the light emitted by the light source 166 projects on the light receiver 168 intermittently through slits 172 in the slot plate 170, generating pulse signals.

These pulse signals are sent to the controller (not shown in the drawing) from the tool holder 18 on the electromagnetic wave as a digital signal. Therefore, the amount of displacement of the correction head 30 can be indirectly detected, based on the state of rotation of the DC motor 36, producing an effect similar to the first implementation style.

Figure 12:
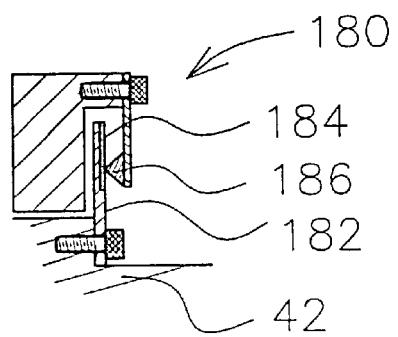
FIG. 12 is a partial longitudinal cross-sectional view of the detection mechanism configuring the working machine engaged with a third implementation style of this invention.
Figure 13:
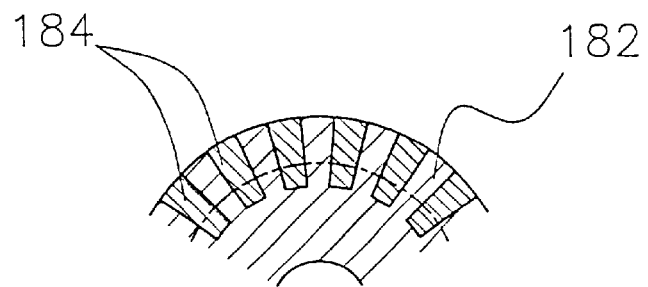
FIG. 13 is a partial front view of the detection mechanism in the tool holder engaged with the third implementation style.

FIGS. 12 and 13 show the detection mechanism (rotation angle detection sensor) 180 configuring the working machine engaged with a third implementation style of this invention. The detection mechanism 180 comprises an electrically conductive disk plate 182 fixed to the drive adapter 42, and nonconductive parts 184 are arranged at an equal angle spacing on disk plate 182. A fixed contact 186 connected with a continuity detector, not shown in the drawing, makes contact with the disk plate 182.

In thus configured detection mechanism 180, the drive adapter 42 and the disk plate 182 rotate in a unified body via the DC motor (not shown in the drawing) similarly to the second implementation style. For this reason, the contact 186 making contact with the disk plate 182 touches alternately the nonconductive part 184 and the said disk plate 182 itself (conductive part), generating ON/OFF signals at a continuity detector not shown in the drawing. The ON/OFF signal is transmitted to the controller (not shown in the drawing) as a digital signal in an electromagnetic wave. Thus the third implementation style produces an effect similar to the second implementation style.

Figure 14:
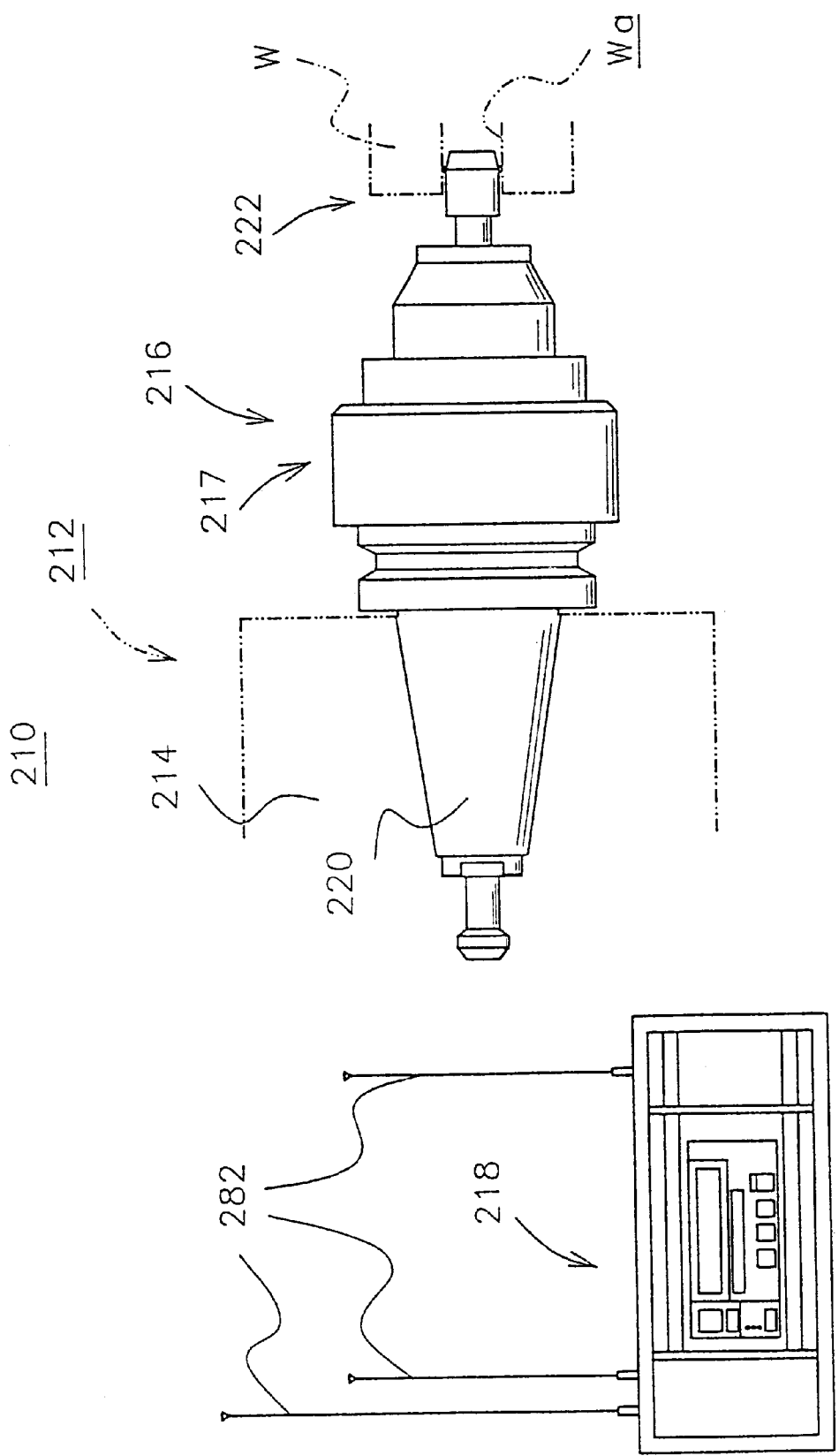
FIG. 14 is an overall view of the working machine engaged with a fourth implementation style of this invention.

FIG. 14 shows the working machine 210 engaged with a fourth implementation style of this invention. The working machine 210 comprises a cutting machine 212, a tool holder 216 which can be mounted to or removed from the spindle 214 of the cutting machine 212, a transmission and reception mechanism 217 installed to the tool holder 216, and a controller 218 which can communicate with the transmission and reception mechanism 217 through radio waves. The spindle 214 is linked to a rotation driving source, not shown in the drawing, to rotate and move in arbitrary directions.

Figure 15:
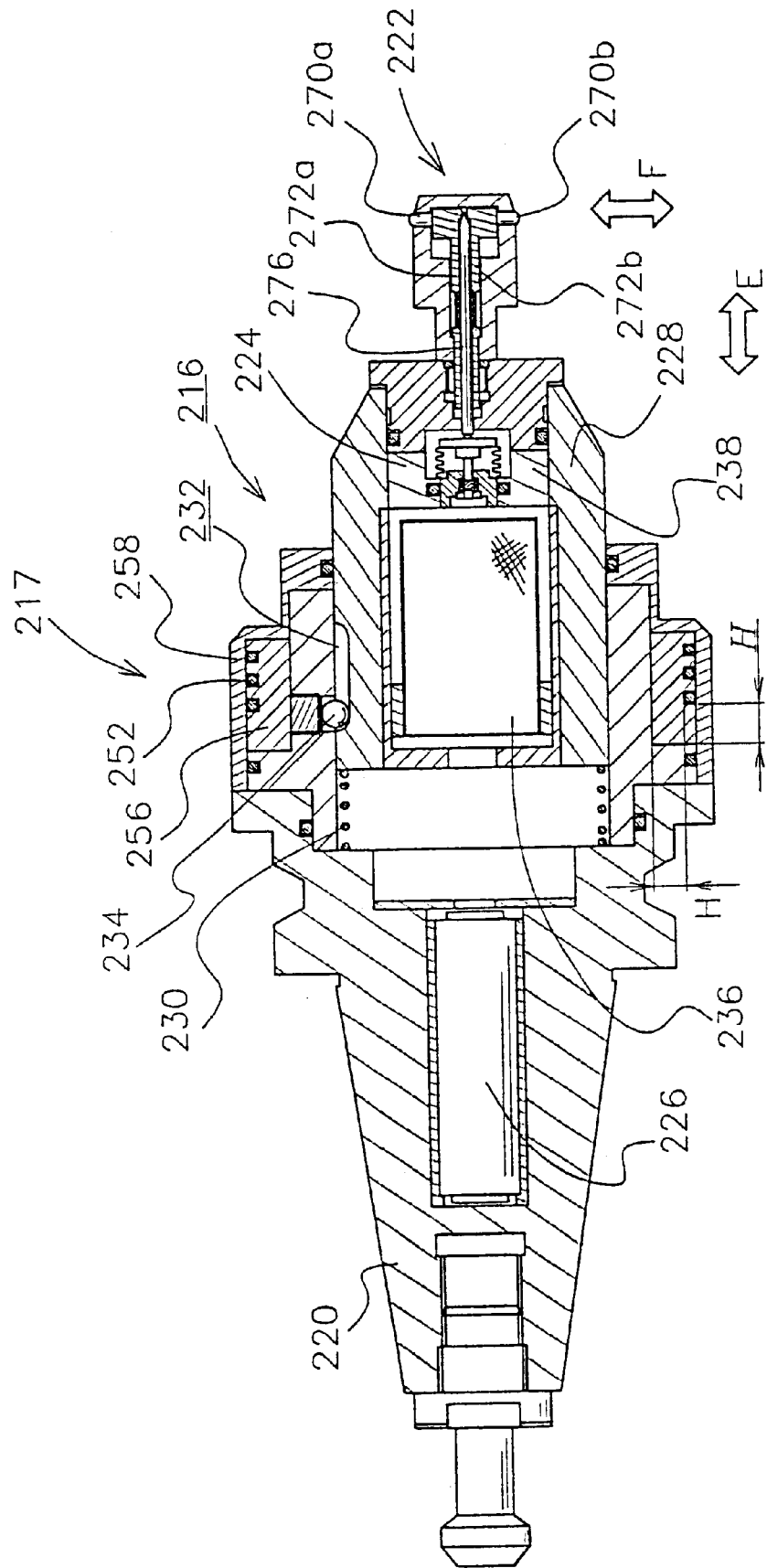
FIG. 15 is a longitudinal cross-sectional view of the tool holder configuring the working machine engaged with the said fourth implementation style.

The tool holder 216 has a shank 220 fitted to the spindle 214 on one end and a measuring head (tool) 222 measuring the machining state of a workpiece W on another end. As shown in FIG. 15, the tool holder 216 houses a detection mechanism 224 for detecting the state of the predetermined action of the measuring head 222, and a battery (DC power supply) 226 for driving the detection mechanism 224.

At the center of the tool holder 216, a cylindrical slide housing 228 is fitted via a spring 230 in the axial direction (direction of arrow E) so that it advances and retracts freely. A guide groove 232 of a predetermined length is cut in the axial direction on the circumference of the slide housing 228. A ball 234 is fitted in the guide groove 232. A circuit board 236 assembled with radio transmission/reception parts is arranged inside the slide housing 228 and a detection mechanism 224 is housed in the front part of the slide housing.

The detection mechanism 224 comprises a displacement detection sensor 240, i.e. a linear sensor, held by a fixed cylinder 238. The sensor 240 has a configuration similar to the sensor 62 of the first implementation style, and the same reference numbers are used with the same components and a detailed description is omitted.

Figure 16:
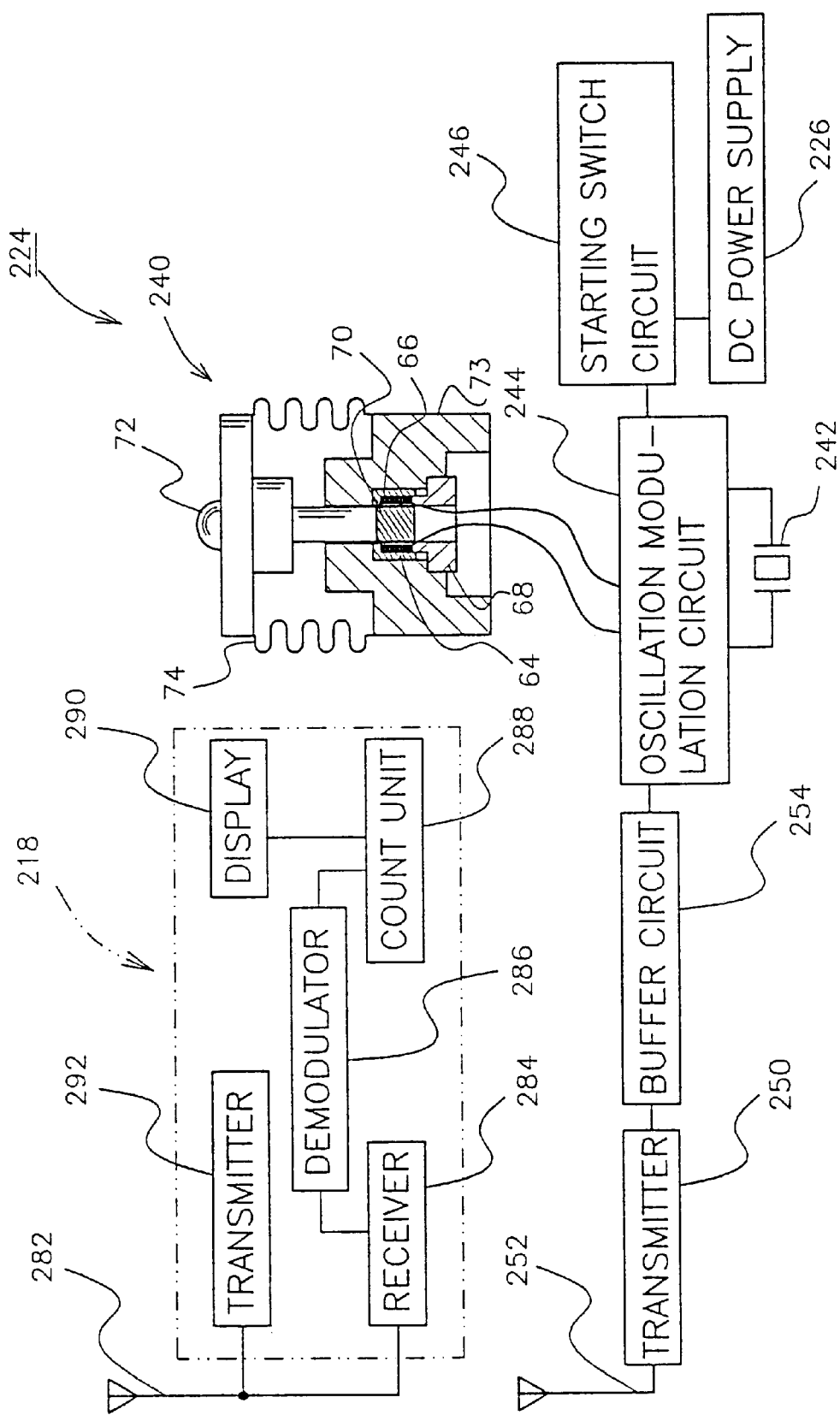
FIG. 16 is a block diagram of the detection mechanism in the tool holder.

As shown in FIG. 16, the coil 66 of the sensor 240 is connected with the oscillation modulation circuit 244 comprising a crystal oscillator 242, a high frequency oscillator (high frequency oscillation means), while battery 226 is connected to an oscillation modulation circuit 244 via a starting switch circuit 246. The starting switch circuit 246 has a configuration similar to the starting switch circuit 100 engaged with the first implementation style, and a detailed description of it is omitted.

The oscillation modulation circuit 244 generates a modulated wave consisting of a basic wave generated by the crystal oscillator 242 and an amount of change in the inductance of the circuit including the coil 66, and it sends the wave via a buffer circuit 254 to a transmitter 250. The modulated wave is sent from the transmitter 250 to the antenna wire 252 as a sensor signal wave, and is transmitted to the controller 218 in a radio wave.

As shown in FIG. 15, the antenna wire 252 is installed on the circumference of the tool holder 216 surrounded by a radio wave transparent material 256 and a cover material 258, thereby configuring a transmission and reception mechanism 217. The tool holder 216 is configured by radio wave absorbing bodies (electrically conductive parts), such as iron and aluminum, similarly to the tool holder 18, and the radio wave transparent material 256, made of synthetic resin, synthetic fiber, compound rubber, glass, paper, wood, porcelain or other materials which pass the radio wave, is installed on the circumference of the tool holder 216. The antenna wire 252 is wound at a certain distance H (1 to 20 mm, or preferably 3 to 8 mm) from the end of the tool holder 216 via the radio wave transparent material 256. The cover material 258 must be superior in the rigidity and water resistance, and it should be made of synthetic resin.

Figure 17:
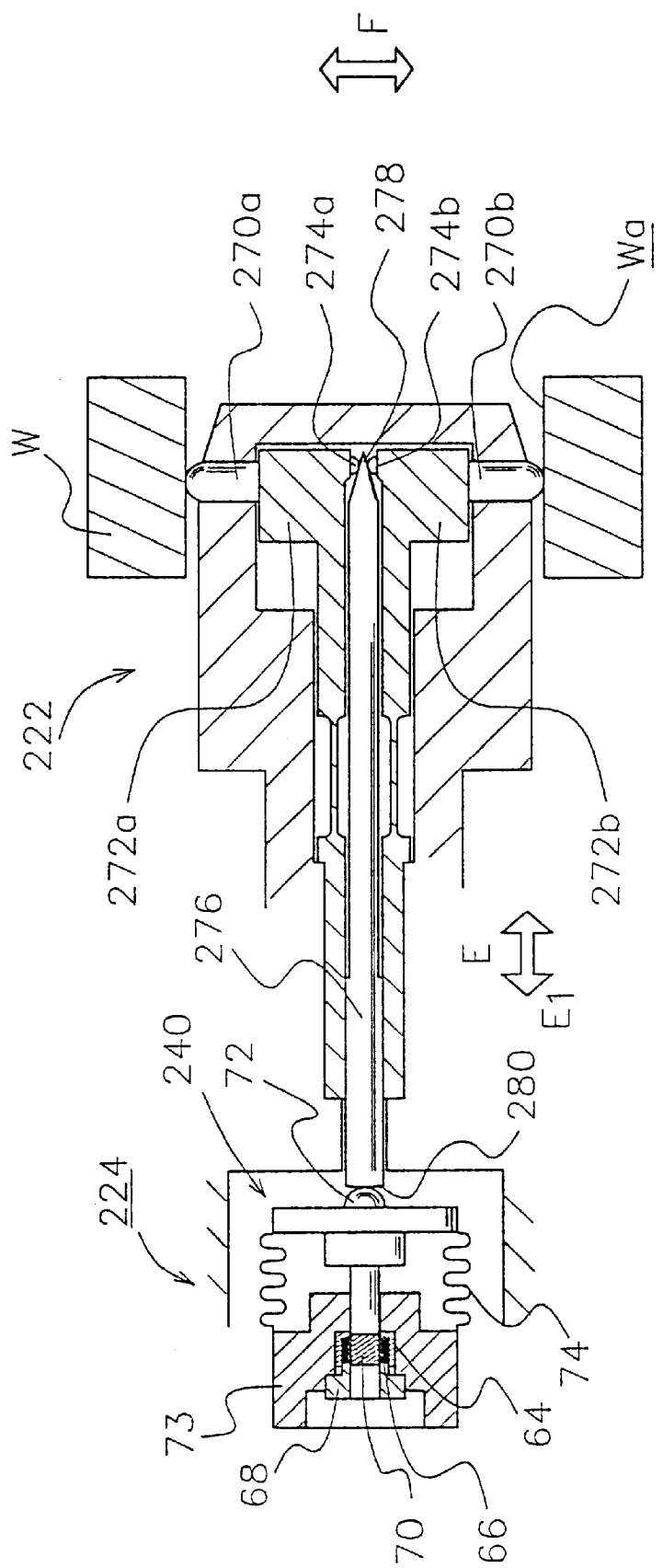
FIG. 17 is a longitudinal cross-sectional view of the measuring head installed to the tool holder.
Figure 18A:
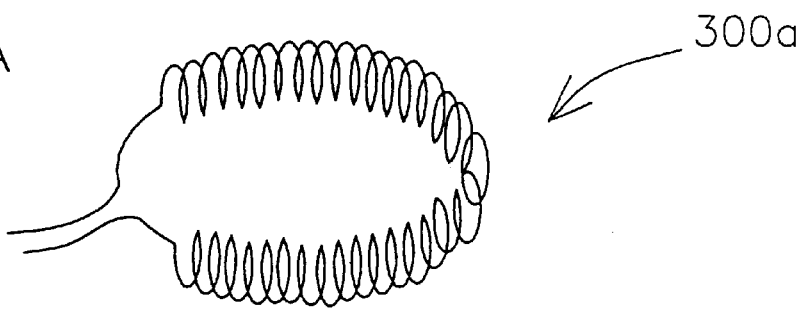
FIG. 18A through FIG. 18E are pictorial drawings of alternate antennas.
Figure 18B:
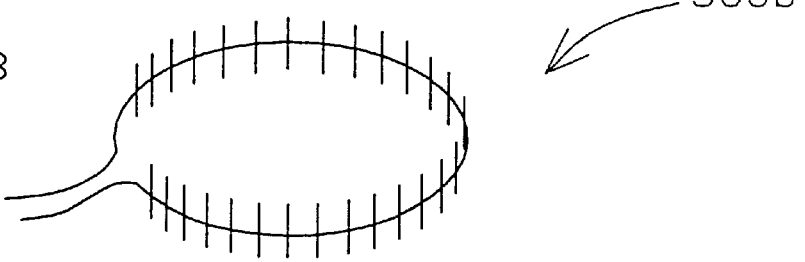
Figure 18C:
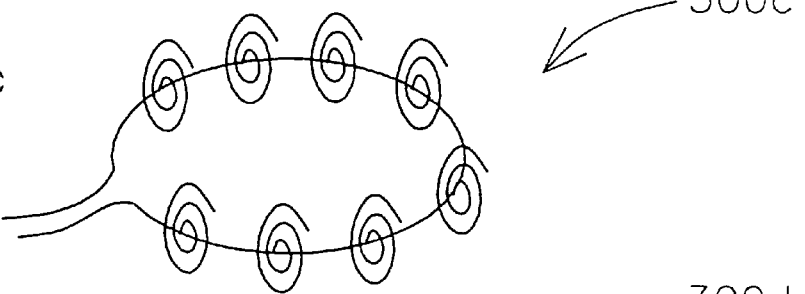
Figure 18D:
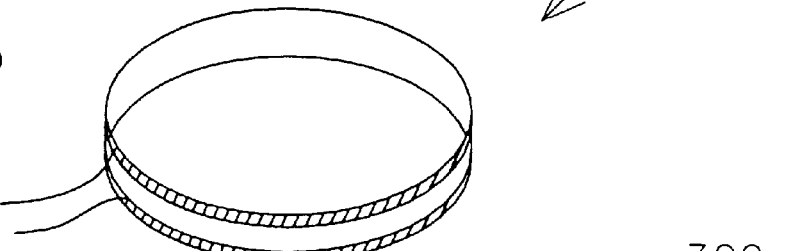
Figure 18E:
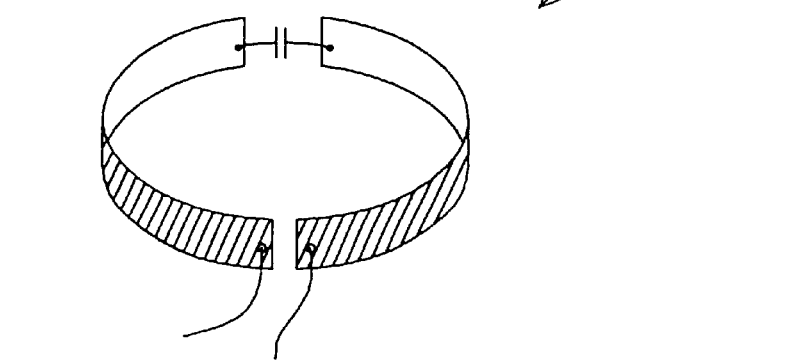

As shown in FIG. 15 and FIG. 17, the measuring head 222 comprises measuring pins (feelers) 270a and 270b which can advance or retract in the diametrical direction (direction of arrow F) at right angles to the axial direction. The measuring pins 270a and 270b are fixed to contact levers 272a and 272b. Contact levers 272a and 272b extend in the direction of arrow E and, at an end contact points 274a and 274b are arranged, facing each other.

A shaft 276 is arranged between contact levers 272a and 272b so that it advances or retracts, and a conical surface 278 engaged with contact points 274a and 274b is formed at the end of the shaft 276. On the other hand, the other end 280 of the shaft 276 makes contact with the contact 72 configuring the sensor 240.

As shown in FIG. 16, the controller 218 comprises a receiver 284 which receives the modulated wave sent from the antenna wire 252 in an electromagnetic wave, and the receiver 284 connected with a demodulator 286. The demodulator 286 is connected with a count unit 288 and the frequency counted at the count unit 288 is converted and displayed at a display 290 as a measuring value while the measuring value of the measuring head 222, that is, the processing state of a workpiece W, such as the bore diameter, is measured. A transmitter 292 for transmitting to the tool holder 216 a modulated wave consisting of a basic wave added by the signal wave is arranged in the controller 218.

The action of the thus configured working machine 210 engaged with the fourth implementation style is described as follows.

The tool holder 216 installed in the spindle 214 moves under the action of the cutting machine 214 in correspondence to the predetermined machining hole Wa of the workpiece W. At the controller 218, a modulated wave is transmitted from the transmitter 292 via the antenna wire 282, and the modulated wave is received at the antenna wire 252 of the tool holder 216. At the tool holder 216, signal confirmation is made similarly to the tool holder 18 in the first implementation style and, upon confirmation of the predetermined signal, work by the tool holder 216 is started.

Concretely speaking, power is supplied from the battery 226 via the starting switch circuit 246 to the oscillation modulation circuit 244 to activate the detection mechanism 224. At this time, when the measuring head 222 is inserted into the machining hole Wa of the workpiece W, the measuring pins 270a and 270b advance or retract in the direction of arrow F while making contact with the internal wall of the machining hole Wa, to press the conical surface 278 of the shaft 276 at the contact points 274a and 274b of the contact levers 272a and 272b. If the diameter of the machining hole Wa is small, the shaft 276 moves in the direction of arrow E1 in FIG. 17 to press the contact 72 of the sensor 240 toward the coil 66, producing a sensor variable high frequency (MHz) signal wave similarly to the first implementation style.

As shown in FIG. 16, the signal wave is sent to the transmitter 250 and transmitted from the transmitter 250 via the antenna 252 to antenna 282 of the controller 218 in a radio wave. At the controller 218, the demodulator 286 retrieves the target frequency, recovering the measuring value of the measuring head 222.

In the case of the fourth implementation style, the transmission and reception mechanism 217 can transmit the measuring value smoothly and securely through radio communication with the controller 218 without effects of the tool holder 216 acting as a radio wave absorbing body, while effects similar to the first implementation style are obtained.

In the description of the fourth implementation style, the measuring head 222 which measures the diameter of the machining hole Wa of the workpiece W is used, but the application is not limited to this; as a head for measuring the depth of a hole (not shown in the drawing) or the like can be used.

In the first and fourth implementation styles, the antenna wires 82 and 252 configuring the transmission and reception mechanisms 20 and 217 are drawn in straight lines; as shown in FIG. 18A through FIG. 18E. However, these antennas can be another type of the linear antenna having a cyclic structure such as a helical antenna wire 300a, a comb tooth shaped antenna wire 300b, a loop shaped antenna 300c, or a plate antenna 300d of a flexible film plated by copper, or a plate antenna 300e where a pair of copper plates are tied at an end with a reducing capacitor, or another antenna.

The working machine engaged with this invention and its communication method use radio communication in an electromagnetic wave between the transmission and reception mechanism, which is installed on the tool holder to which the tool is mounted, and an external controller, where the transmission and reception mechanism comprises an antenna wound at a certain distance from the electrically conductive part of the tool holder via a radio wave transparent material. This feature makes it possible to send and receive radio signals between the transmission and reception mechanism and controller without effects from the tool holder itself consisting of electrically conductive parts, such as iron and aluminum, that is, as a radio wave absorbing body.

What is claimed is:

1. A working machine comprising:
   a tool holder in which a tool is mounted;
   a transmission and reception mechanism installed to said tool holder; and
   a controller which performs radio communication with said transmission and reception mechanism on electromagnetic waves;
   wherein said transmission and reception mechanism includes:
   an antenna located at a certain distance from electrically conductive parts forming said tool holder; and
   a radio wave transparent material intervening between said antenna and said electrically conductive parts.

2. A working machine as claimed in claim 1 wherein a radio wave transparent cover material surrounds said antenna.

3. A working machine as claimed in claim 1 wherein said tool holder houses a detection mechanism for detecting a predetermined state of operation of the tool holder.

4. A working machine as claimed in claim 3 wherein:
   said tool holder is removably installed to the spindle;
   said tool holder has a correction head for adjusting the position of said tool in the diametrical direction of said spindle, and a rotation energy source for driving said correction head; and
   said detection mechanism has a sensor for detecting the state of adjustment of said correction head, and a means for transmitting to the said controller by radio communication information detected by said sensor.

5. The working machine as claimed in claim 4 wherein said sensor is a linear sensor for detecting changes in the position of said correction head.

6. A working machine as claimed in claim 4 wherein said sensor is a rotation angle detection sensor detecting the changes in the position of said correction head from a digital pulse wave based on the angle of rotation of said correction head.

7. A working machine as claimed in claim 3 wherein:
   said tool holder comprises a measuring head for detecting a machining state of the workpiece as said tool; and
   said detection mechanism has a sensor for detecting a state of action of said measuring head, and a means for transmitting to said controller by the radio communication information detected by said sensor.

8. A working machine as claimed in claim 7 wherein said sensor is a linear sensor detecting changes in the position of a feeler configuring said measuring head.

9. A working machine as claimed in claim 1 wherein:
   said tool holder houses a power supply for supplying electric energy; and
   a starting switch circuit for supplying electric energy from said power supply to the predetermined operation unit inside said tool holder upon radio communication from said controller.

10. A working machine as claimed in claim 9 wherein said tool holder has a state display driven by said starting switch circuit.

11. A radio communication means between a tool holder for mounting a tool and an external controller of a working machine comprising:
    a controller transmitting an electromagnetic wave to a tool holder to supply predetermined operation signals to said tool holder; and
    said tool holder transmitting back an electromagnetic radio wave having received said operation signals from said controller for the confirmation of the supply of said predetermined operation signals.

12. A radio communication means between a tool holder for mounting a tool and an external controller of a working machine comprising: sender means for transmitting a basic carrier electromagnetic wave and an indentifying signal wave simultaneously, and a receiver for receiving the indentifying signal wave and the basic carrier electromagnetic wave and performing a predetermined operation corresponding to the received indentifying signal wave only when both said basic carrier electromagnetic wave and said indentifying signal wave are received.

13. A radio communication means of a working machine as claimed in claim 12 wherein said tool holder receives both said basic carrier electromagnetic wave and said indentifying signal wave, and the tool holder transmits back to said controller an basic carrier electromagnetic wave for operation confirmation.

* * * * *